March 3, 1942.  E. ELIASON  2,274,678
DRINKING TROUGH
Filed May 19, 1941
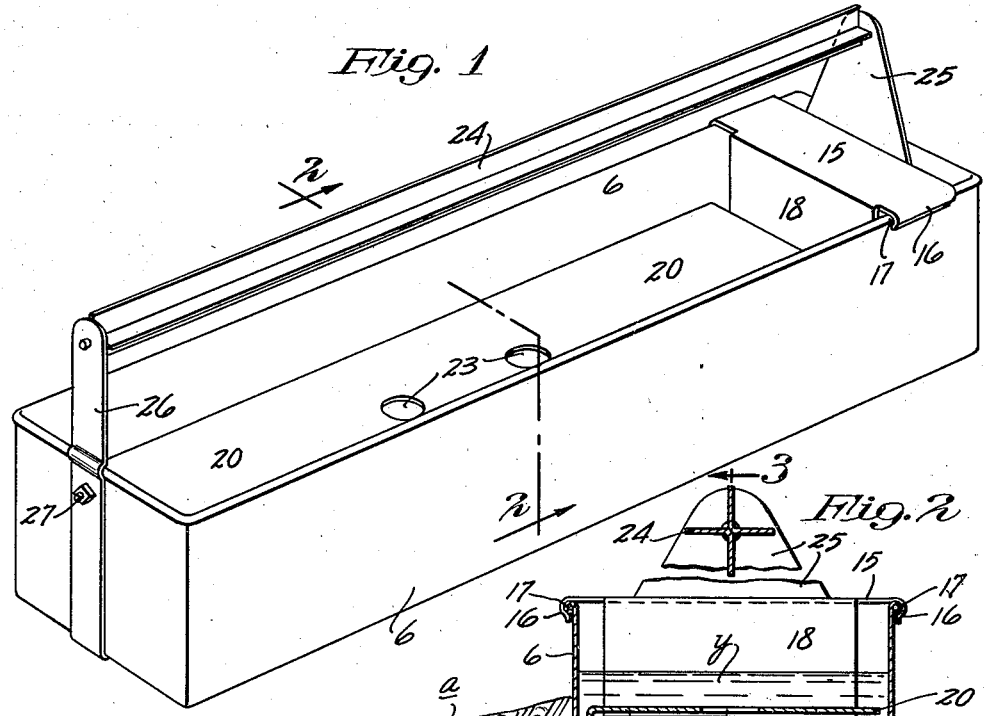
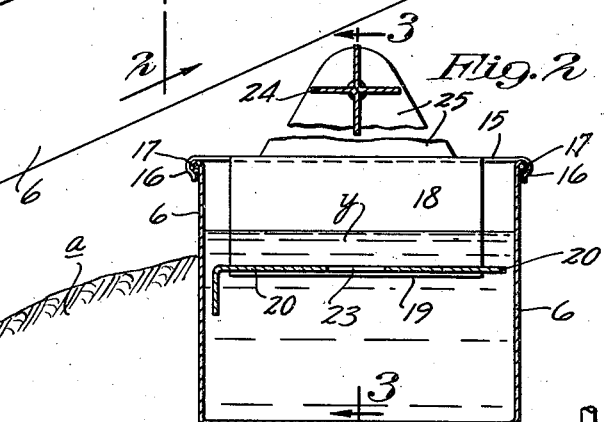
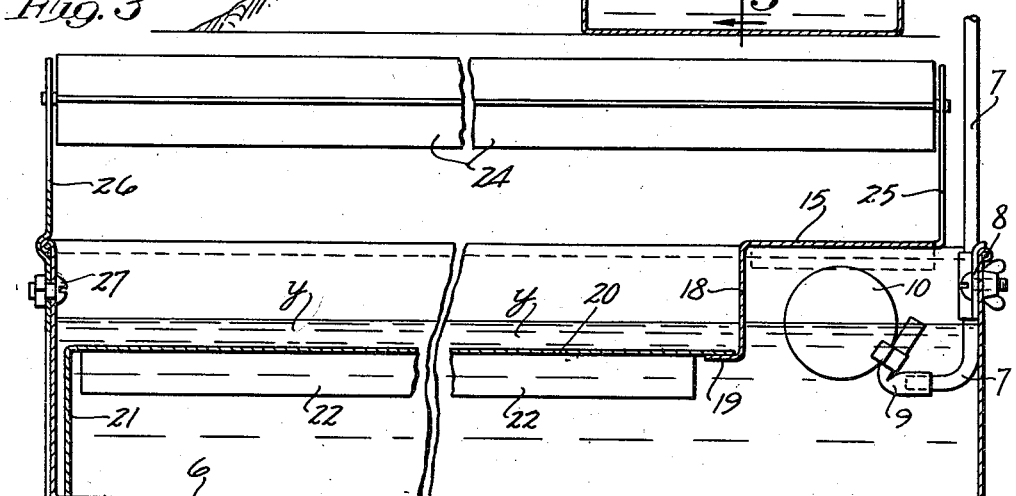
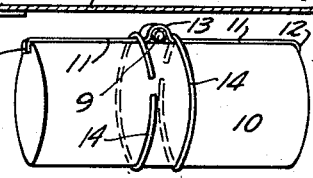
Inventor
Elmer Eliason
By his Attorneys Patented Mar. 3, 1942

2,274,678

UNITED STATES PATENT OFFICE 2,274,678

DRINKING TROUGH

Elmer Eliason, Minneapolis, Minn.

Application May 19, 1941, Serial No. 394,070

4 Claims. (Cl. 119—78)

My present invention relates to drinking troughs and is especially designed to furnish drinking water for chickens or other fowls; but may be used for other analogous purposes.

Generally stated, the invention consists of the novel devices, combinations of devices, and arrangement of parts hereinafter described and defined in the claims.

In the designing of this water trough it has been my object to provide such a device that may be quickly adapted for the watering of large chickens or fowls where little chicks are not present, but which may be converted into a watering device for small chicks and, when used for this latter purpose, will prevent the chickens from being drowned while drinking.

In this improved device the watering trough is provided with a false bottom that may be readily inserted or removed and which, when applied, will be slightly below the surface of the liquid in the trough and will afford a support and a shallow water supply for the chicks just above the false bottom. The invention also involves certain other improved features, all of which will hereinafter be described and defined in the claims. The trough is equipped with a water supplying device that automatically controls the level of the water in the trough.

In the accompanying drawing, which illustrates a commercial form of the device, like characters indicate like parts throughout the several views.

Referring to the drawing:

Fig. 1 is a view in perspective showing the improved watering trough with the false bottom applied therein;

Fig. 2 is a transverse vertical section taken on the line 2—2 of Fig. 1, some parts being broken away;

Fig. 3 is a longitudinal vertical section taken approximately on the line 3—3 of Fig. 2; and Fig. 4 is a detail showing in perspective the water controlling float or device, a supporting element for said float being sectioned.

In this preferred form of the device the water receptacle is in the form of an elongated sheet metal tank, indicated by the numeral 6. When this device is to be used for the watering of chicks, it may be slightly embedded in the ground, or inclined embankments $a$ may be thrown up against the sides thereof to enable the chicks to reach the water in the trough.

Water will be supplied to the trough preferably through a supply pipe 7 shown as clamped to one end of the trough by a clamp 8. The water supply tube 7, at its lower end and below the surface of the liquid $y$ contained in the trough, has a laterally bent end to which is applied a short flexible rubber tube 9 which, when straightened out, will permit the flow of water therethrough and which, when kinked or bent as shown in Fig. 3, will act as a valve and choke or cut off the supply of liquid. To automatically straighten and kink the tube 9 according to the altitude of the water, the delivery end of the flexible tube 9 is attached to a float 10. This float 10 is preferably an air-tight thin sheet metal drum that is located transversely of the trough close to one end thereof, to wit: close to that end to which the clamp 8 is applied. The flexible end of tube 9 is preferably detachably clamped to the central portion of the float 10 by a device substantially or nearly like the device disclosed and claimed in my prior Patent No. 2,241,636 of date May 13, 1941. This device involves a spring-acting metallic anchoring bar 11 that has spring-acting ends 12 that engage the ends of the float 10. At its central portion the bar 11 has a loop 13 that quite closely embraces the delivery end of the flexible tube 9 and thus firmly but adjustably holds the tube to said float.

To further insure clamping of the looped central portion of the bar 11 onto the float and onto tube 9, split or spring-acting rings 14 are adapted to be slipped over the float and engaged with the intermediate portion of bar 11 close to its loop 13.

The float 10, is, as stated, located close to one end of the trough. This float is normally covered by a sheet metal platform structure or deck 15 which, at its sides, has downwardly and inwardly turned clamping flanges 16 that are adapted to be readily sprung over the beaded edges 17 of the trough. The platform or deck 15 is provided with a depending plate 18 having horizontally projecting flanges 19.

The false bottom is preferably a thin sheet metal plate 20, one end of which is adapted to rest on the flange 19 of the deck, and on the other end of which false bottom 20 is a downturned flange or end plate 21 that rests upon the bottom of the trough. One edge of the false bottom 20 is shown as provided with a downturned reinforcing or stiffening flange 22. The deck 15 may be provided with holes 23 but even without these holes the water will seek its level above the false bottom, substantially as best shown in Fig. 3. However, these holes afford convenient finger grips for removal of the false bottom.

When access to the float 10 is desired, the false bottom 20 should first be picked up and removed and then the deck 15 may be freely slid along the edges of the trough to uncover and expose the float for repair, adjustment or for other reasons. When the trough is to be cleaned, both the false bottom and the deck may be easily removed and after cleaning may be quickly replaced.

To prevent the chicks from running back and forth over the false bottom and thereby dirtying up the water, there is provided a blade-equipped rotor 24 which, at its ends, has trunnions journaled in a supporting flange 25 at one end and in a supporting bracket or strap 26 at its other end. The flange 25 is preferably an upturned portion of the deck 15 while the bracket 26 is preferably a metallic strap detachably secured to one end of the trough by a nut-equipped bolt 27. With the above described arrangement, even if the false bottom 20 should be removed, the blade-equipped rotor 24 would hold the deck 15 against sliding movement so that this blade-equipped rotor must be removed to permit the above sliding movement of the deck. It is important to note that the supporting flange 25 on the deck 15 is located inward of the adjacent end wall of the trough so that there is ample clearance for the water supply tube and access to the clamp 8.

The above described device may be made at comparatively small cost, is convenient to use, and highly efficient for the purposes had in view.

When the device is to be used for watering grown chickens, ducks, or the like, not only the false bottom 20 should be removed, but the blade-equipped member or rail 24 should be removed; and in fact, when the device is designed solely for the use of the larger fowls, the said elements 20 and 24 will not be required nor provided.

What I claim is:

1. In a device of the kind described, a water-containing trough provided at one end with a raised deck formed with a depending end plate having a projecting rest flange, and a false bottom removably applied in said trough with one end supported on said rest flange of said deck, said false bottom, at its other end, having a depending flange resting on the bottom of said trough, and in which structure said deck is slidably mounted on the side rims of said trough.

2. In a device of the kind described, a water-containing trough provided at one end with a raised deck formed with a depending end plate having a projecting rest flange, and a false bottom removably applied in said trough with one end supported on said rest flange of said deck, said false bottom, at its other end, having a depending flange resting on the bottom of said trough, and in further combination with a water supply tube extended into said trough at one end thereof and terminating in a flexible tubular delivery section, and a float detachably applied to the latter at the end of the trough immediately under said deck.

3. In a device of the kind described, a water-containing trough provided at one end with a raised deck formed with a depending end plate having a projecting rest flange, and a false bottom removably applied in said trough with one end supported on said rest flange of said deck, said false bottom, at its other end, having a depending flange resting on the bottom of said trough, and in further combination with a water supply tube extended into said trough at one end thereof and terminating in a flexible tubular delivery section, and a float detachably applied to the latter at the end of the trough immediately under said deck, said deck, adjacent the end of said trough to which said water supply tube is applied, having an upturned supporting flange, said trough, at its other end, having a detachable supporting bracket, and a blade-equipped rotor journaled to said supporting flange and supporting bracket.

4. In a device of the kind described, a water-containing trough provided at one end with a raised deck formed with a depending end plate having a projecting rest flange, and a false bottom removably applied in said trough with one end supported on said rest flange of said deck, said false bottom, at its other end, having a depending flange resting on the bottom of said trough, and in which structure said false bottom, at one side, has a depending reinforcing flange, said deck being slidable on the upper edges of the sides of said trough but held against such sliding movement when said false bottom is in position.

ELMER ELIASON.